United States Patent
Takaoka

[19]

[11] Patent Number: 5,819,871
[45] Date of Patent: Oct. 13, 1998

[54] ELECTRIC POWER STEERING DEVICE

[75] Inventor: Manabu Takaoka, Kashiba, Japan

[73] Assignee: Koyo Seiko Co., Ltd., Osaka, Japan

[21] Appl. No.: 787,911

[22] Filed: Jan. 23, 1997

[30] Foreign Application Priority Data

Jan. 30, 1996 [JP] Japan .................................. 8-037525

[51] Int. Cl.$^6$ ...................................................... B62D 5/04
[52] U.S. Cl. ..................... 180/444; 192/37; 74/388 PSA; 74/412 TA
[58] Field of Search ................................... 180/444, 443; 192/37, 39; 74/388 PS, 412 TA, 406

[56] References Cited

U.S. PATENT DOCUMENTS

| | | | |
|---|---|---|---|
| 4,726,437 | 2/1988 | Norton | 180/444 |
| 5,016,740 | 5/1991 | Ito et al. | 74/388 PS |
| 5,213,173 | 5/1993 | Konishi et al. | 180/444 |
| 5,482,128 | 1/1996 | Takaoka et al. | 180/444 |

FOREIGN PATENT DOCUMENTS 7-117690  5/1995  Japan .

Primary Examiner—Lee W. Young
Assistant Examiner—Pamela J. Lipka
Attorney, Agent, or Firm—Thelen Reid & Priest, L.L.P.

[57] ABSTRACT

A torque is transmitted from a steering assistance motor to a steering shaft via a gear. The first rotation restraining element, which is radially deformed by being sandwiched between the outer circumference of the steering shaft and the inner circumference of the gear, exerts a radial force corresponding to the radial deformation on the steering shaft and the gear, to generate a torque based on friction for restraining the relative rotation between the shaft and gear. The restraining torque generated based on the deformation of the first rotation restraining element is smaller than the breaking torque of the second rotation restraining element, which is fitted to the steering shaft and the gear via clearances so as to restrain the relative rotation between the shaft and gear.

4 Claims, 7 Drawing Sheets

ELECTRIC POWER STEERING DEVICE

FIELD OF THE INVENTION

The present invention relates to an electric power steering device which transmits a steering assistance torque generated by a motor to a steering shaft via a gear.

DESCRIPTION OF RELATED ART

In an electric power steering device which transmits a steering assistance torque to the steering shaft via a gear, the relative rotation between the steering shaft and the gear is restrained by fitting the steering shaft to the gear via a key, pin, or the like.

When an excessive torque is exerted on the steering shaft, the relative rotation between the steering shaft and the gear is allowed by the breakage of the key, pin, or the like. This allowance of the relative rotation enables manual steering operation for fail-safe driving in the case of motor locking, and prevents the gear from breakage due to motor inertia which is exerted when the steering angle reaches its limit. In short, the key, pin, or the like serves as a safety as if a mechanical fuse (Japanese Patent Unexamined Publication No. H7-117690).

The above-described key, pin, or the like is fitted to the steering shaft and the gear via clearances, which is provided to satisfy the requirement for assembling. For this reason, when the steering assistance torque is transmitted from the gear to the steering shaft via the key, pin, or the like, relative rotation between the steering shaft and the gear can not be restrained by a distance corresponding to the clearances. As a result, the problem of steering feeling reduction arises.

The object of the present invention is to provide an electric power steering device free from the above-described problem.

SUMMARY OF THE INVENTION

The electric power steering device according to the present invention comprises a steering shaft, a gear fitted on the outer circumference of the steering shaft, a steering assistance motor generating a torque to be transmitted to the steering shaft via the gear, a first rotation restraining element which is radially deformed by being sandwiched between the outer circumference of the steering shaft and the inner circumference of the gear, and a second rotation restraining element fitted to the steering shaft and the gear via clearances so as to restrain the relative rotation between the steering shaft and the gear, wherein a frictional torque for restraining the relative rotation between the steering shaft and the gear is generated by exerting a radial force corresponding to the radial deformation of the first rotation restraining element on the steering shaft and the gear, and wherein the restraining torque generated based on the deformation of the first rotation restraining element is set to a value lower than the breaking torque of the second rotation restraining element.

According to the electric power steering device of the present invention, the torque for restraining the relative rotation between the steering shaft and the gear can be generated based on the frictional resistance between the first rotation restraining element and the steering shaft and also the frictional resistance between the first rotation restraining element and the gear, by exerting a radial force corresponding to the radial deformation of the first rotation restraining element on the steering shaft and the gear.

By setting the restraining torque to a value greater than the steering assistance torque generated by the motor, the relative rotation between the steering shaft and the gear can be restrained when the steering assistance torque is transmitted from the gear to the steering shaft. Therefore, steering feeling reduction can be prevented.

When an excessive torque is exerted on the steering shaft in excess of the restraining torque generated based on the deformation of the first rotation restraining element, the second rotation restraining element is broken so as to allow the relative rotation between the steering shaft and the gear. Therefore, manual steering operation for fail-safe driving in the case of motor locking is enabled, and the gear is prevented from breakage due to motor inertia which is exerted when steering angle reaches its limit. In short, the second rotation restraining element serves as a safety as if a mechanical fuse.

Furthermore, because the restraining torque generated based on the deformation of the first rotation restraining element is smaller than the breaking torque of the second rotation restraining element, the first rotation restraining element can be made compact, whereby the necessity of enlargement of the electric power steering device is obviated.

In summary, according to the present invention, steering feeling reduction can be prevented without enlarging the electric power steering device. Also, fail-safe driving is ensured because manual steering operation in the case of motor locking is enabled, and gear breakage due to motor inertia is prevented when steering angle reaches its limit.

In the present invention, it is preferable that the first rotation restraining element has a characteristic, in that the radial force increases in proportion to the radial deformation when its radial deformation is less than a specific value, and the ratio of increase in the radial force to the radial deformation when the radial deformation exceeds the specific value is smaller than that when the radial deformation is less than the specific value, and that the radial deformation is set to a value in a range in which the radial deformation exceeds the specific value.

By this arrangement, even if the radial deformation of the first rotation restraining element changes from a design value by the machining tolerance of the outside diameter of the steering shaft and the inside diameter of the gear, the change of the radial force due to the change of the radial deformation can be reduced. Therefore, the restraining torque, which is determined in accordance with the radial force, can be set precisely to a value within a desirable setting range.

In the present invention, it is preferable that there is provided a means for restraining the axial and radial movements of the gear relative to the steering shaft.

This constitution prevents the change of the gear's contact rate and the change of the gear's backlash, thus preventing the change of steering feeling.

DETAILED DESCRIPTION OF PREFERRED EMBODIMENT

An embodiment of the present invention is hereinafter described with reference to FIGS. I through 7.

Figure 1:
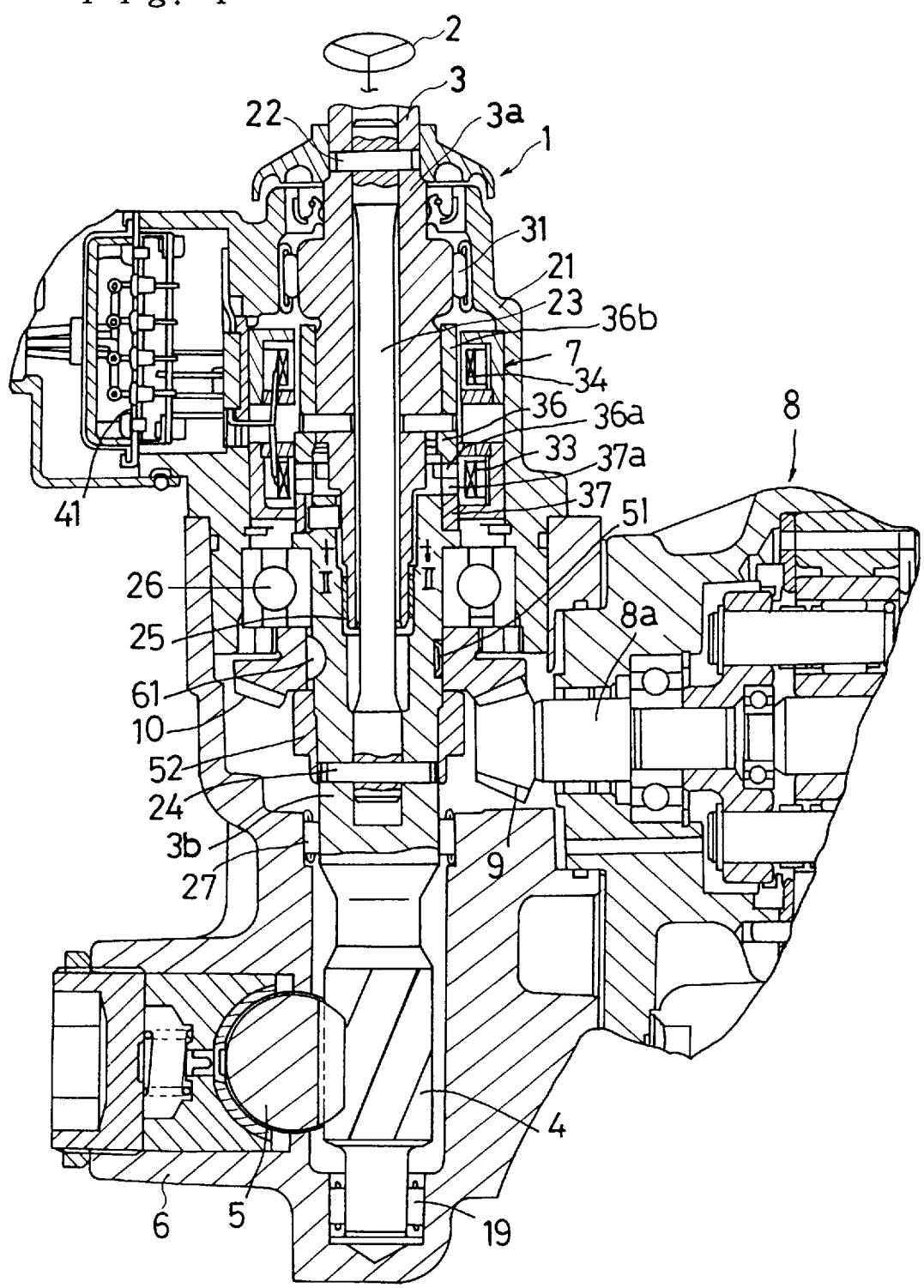
FIG. 1 is a cross-sectional view of the electric power steering device of an embodiment of the present invention.

The electric power steering device 1 illustrated in FIG. 1 transmits a steering torque, which is generated by steering operation of a steering wheel 2, to a pinion 4 by a steering shaft 3. Thereby, a rack 5 engaged with the pinion 4 is moved, so that the steering angle of vehicle wheels joined to the rack 5 via tie rods, knuckle arms, etc. (not illustrated) is changed.

To provide a steering assistance power corresponding to the steering torque transmitted by the steering shaft 3, there are provided a torque sensor 7 for detecting the steering torque, a steering assistance motor 8 driven according to the detected steering torque, a driving bevel gear 9 attached to the output shaft 8a of the motor 8, and a driven bevel gear 10 engaged with the driving bevel gear 9.

The housing 21 of the torque sensor 7 is unified to a rack housing 6 covering the rack 5. The above-described motor 8 is fitted in the rack housing 6.

In the housing 21 of the torque sensor 7, the steering shaft 3 is divided into two segments: one segment is a first shaft 3a linked to the steering wheel 2, and the other segment is a cylindrical second shaft 3b fitted on the outer circumference of the first shaft 3a via a bush 25 so as to be rotatable relative to the first shaft 3a. The first shaft 3a is supported by the housing 21 via a bearing 31. The second shaft 3b is supported by the housing 21 of the torque sensor 7 and by the rack housing 6 via bearings 26, 27 and 19. The above-described pinion 4 is unified to the outer circumference of the second shaft 3b.

A torsion bar 23 is inserted in the shafts 3a and 3b along their center line. One end of the torsion bar 23 is connected to the first shaft 3a via a pin 22, and the other end is connected to the second shaft 3b via another pin 24, whereby the first shaft 3a and second shaft 3b are elastically rotatable to each other according to steering torque.

Figure 2:
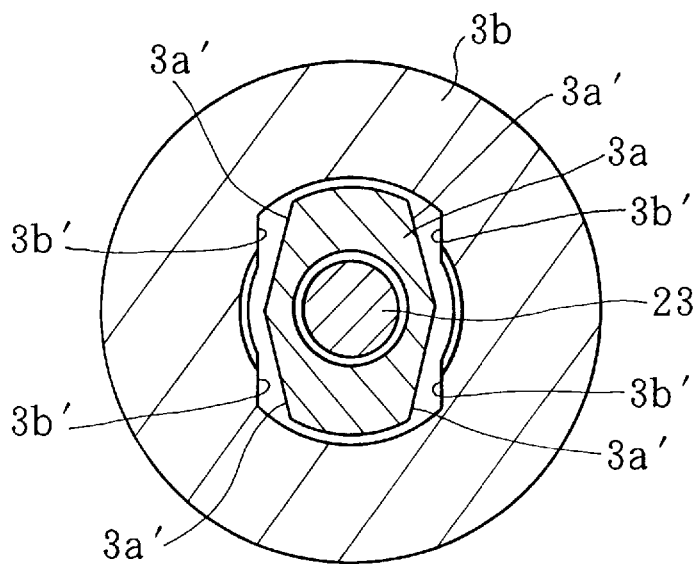
FIG. 2 is a cross-sectional view of FIG. 1 along the II—II line.

As illustrated in FIG. 2, a portion of the outer circumference of the first shaft 3a and a portion of the inner circumference of the second shaft 3b constitute non-circular portions 3a' and 3b', which face to each other. Since the non-circular portion 3a' of the first shaft 3a and the non-circular portion 3b' of the second shaft 3b can contact with each other, the relative rotation of the two shafts 3a and 3b is restrained within a given range. Therefore, breakage of the torsion bar 23 is prevented when an excessive torque is exerted on the steering shaft 3.

The torque sensor 7 has a first detection coil 33 retained by the housing 21, a second detection coil 34 retained by the housing 21, a first detection ring 36 made of a magnetic material and fixed on the outer circumference of the first shaft 3a, and a second detection ring 37 made of a magnetic material and fixed on the outer circumference of the second shaft 3b.

One face of the first detection ring 36 and one face of the second detection ring 37 are arranged so as to be opposite to each other. On the mutually opposite faces of the detection rings 36 and 37, a plurality of teeth 36a and 37a are provided along the circumferential direction.

In the first detection ring 36, the outer circumference adjacent to the other face is a lesser-diameter portion 36b whose outer diameter is smaller than that of the outer circumference adjacent to the one face.

The inner circumference adjacent to the other face of the first detection ring 36 has an inner diameter which is greater than the outer diameter of the shaft 3a so that a gap is provided between the first detection ring 36 and the shaft 3a, whereby magnetic flux leakage from the first detection ring 36 to the shaft 3a is prevented at the other face side.

The first detection coil 33 is arranged to surround a gap between the first detection ring 36 and the second detection ring 37. The second detection coil 34 is arranged to surround the first detection ring 36. Each of the detection coils 33 and 34 is connected to a printed board 41 attached to the housing 21.

Figure 3:
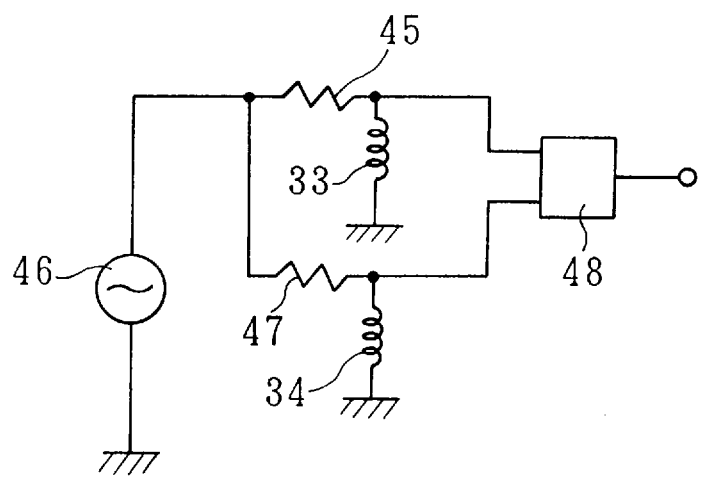
FIG. 3 is a block diagram for explanation of the circuit arrangement of the torque sensor of the electric power steering device of the embodiment of the present invention.

The printed board 41 has a signal processing circuit illustrated in FIG. 3.

Specifically, the first detection coil 33 is connected to an oscillator 46 via a resistor 45, the second detection coil 34 is connected to the oscillator 46 via a resistor 47, and each of the detection coils 33 and 34 is connected to a differential amplifier 48.

By this constitution, when the torsion bar 23 is twisted by transmitted torque, the first detection ring 36 and the second detection ring 37 rotate relative to each other. This relative rotation causes the facing areas of the teeth 36a and 37a of the detection rings 36 and 37 to be changed. This change of the areas causes the magnetic reluctance with respect to the magnetic flux generated by the first detection coil 33 in the gap between the teeth 36a and 37a to be changed. Because the output of the first detection coil 33 is changed in accordance with the change of the magnetic reluctance, a transmission torque corresponding to the output is detected.

The second detection coil 34 faces the lesser-diameter portion 36b of the first detection ring 36. The outer diameter of the lesser-diameter portion 36b is determined such that, the magnetic reluctance with respect to the magnetic flux generated by the second detection coil 34 and the magnetic reluctance with respect to the magnetic flux generated by the first detection coil 33 are equalized to each other when there is no steering resistance. Therefore, fluctuations of the output of the first detection coil 33 due to temperature change is canceled out by the differential amplifier 48, because it is equalized to the fluctuations of the output of the second detection coil 34 due to temperature change, whereby fluctuations of the detected value of the transmitted torque due to temperature change are compensated for.

According to signals corresponding to the transmitted torque outputted by the differential amplifier 48, the steering assistance motor 8 is driven. The torque generated by the steering assistance motor 8 is transmitted from the driving bevel gear 9 to the steering shaft 3 via the driven bevel gear 10, whereby a steering assistance power is provided.

The above-described driven bevel gear 10 is fitted on the outer circumference of the above-described second shaft 3b via a first rotation restraining element 51 and a second rotation restraining element 61.

Figure 4:
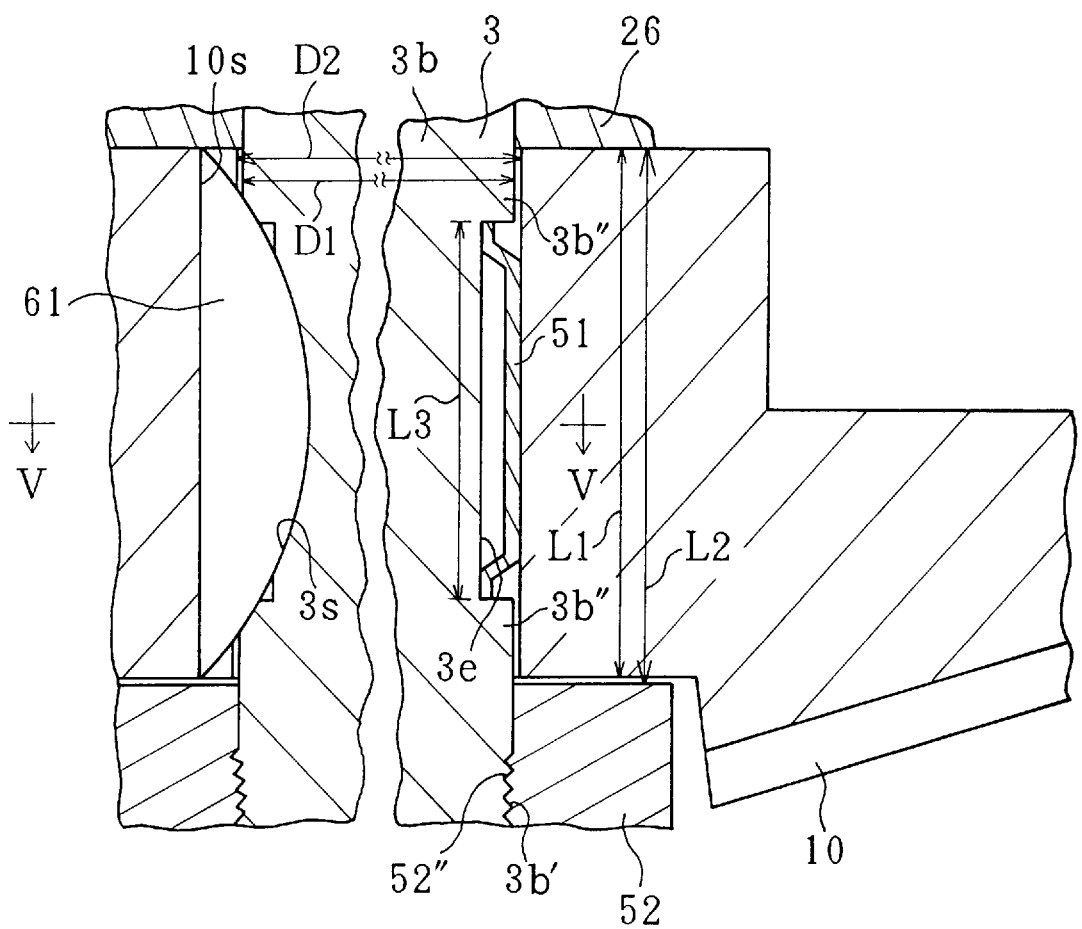
FIG. 4 is a cross-sectional view of the main portion of the electric power steering device of the embodiment of the present invention.
Figure 5:
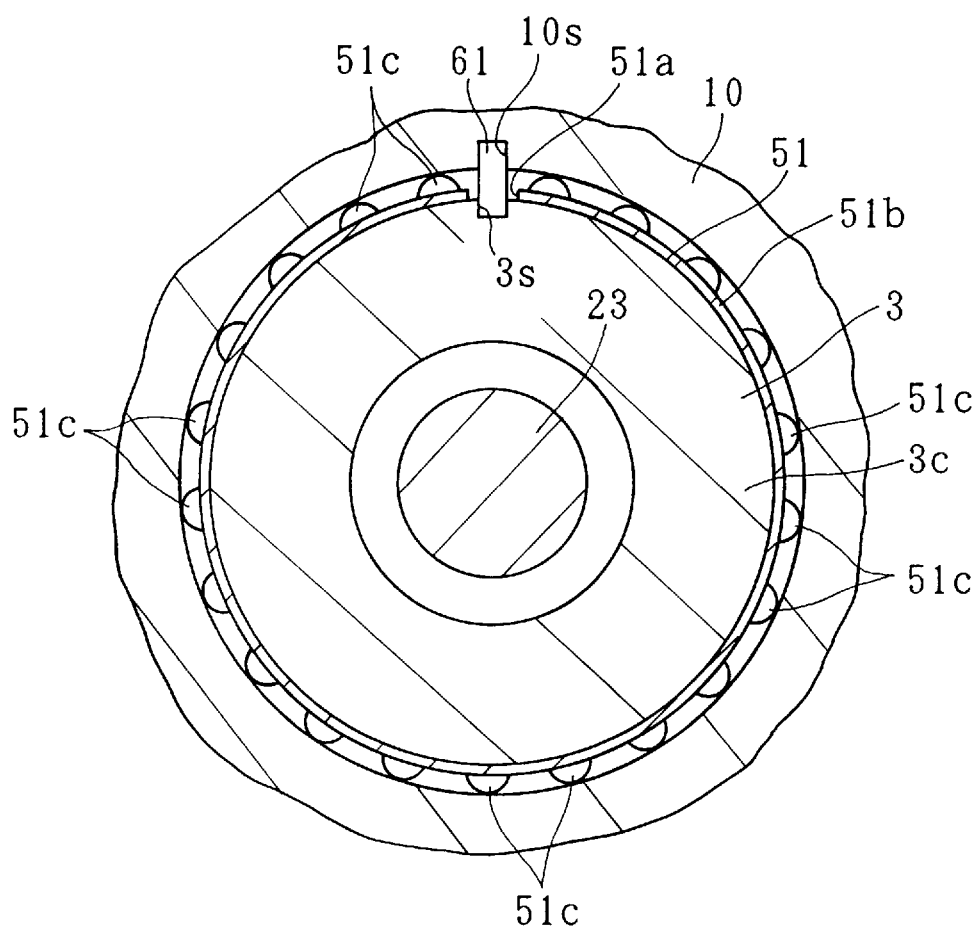
FIG. 5 is a cross-sectional view of FIG. 4 along the V—V line.
Figure 6:
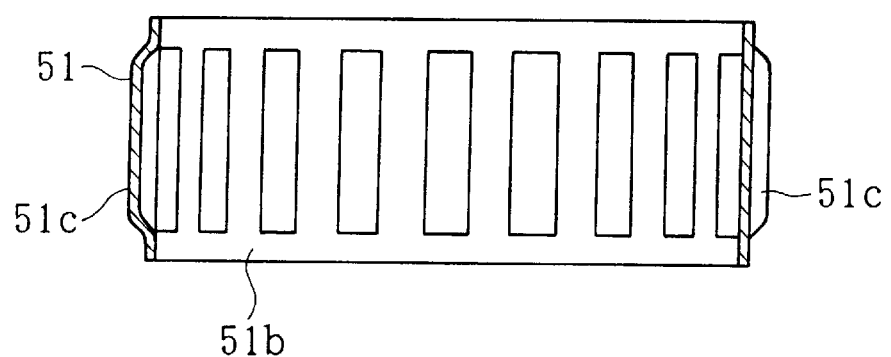
FIG. 6 is a cross-sectional view of the first rotation restraining element in the embodiment of the present invention.

As illustrated in FIGS. 4 and 5, the first rotation restraining element 51 is radially deformed by being sandwiched between the outer circumference of the second shaft 3b and the inner circumference of the driven bevel gear 10. In this embodiment, the first rotation restraining element 51 comprises a metal ring body 51b having a split 51a, as illustrated in FIGS. 5 and 6. The ring body 51b has a plurality of radially outwardly protruding semi-cylindrical projections 51c formed at constant intervals along the circumferential direction. A radial force corresponding to the radial deformation of each of the projections 51c is exerted on the steering shaft 3 and the driven bevel gear 10.

Figure 7:
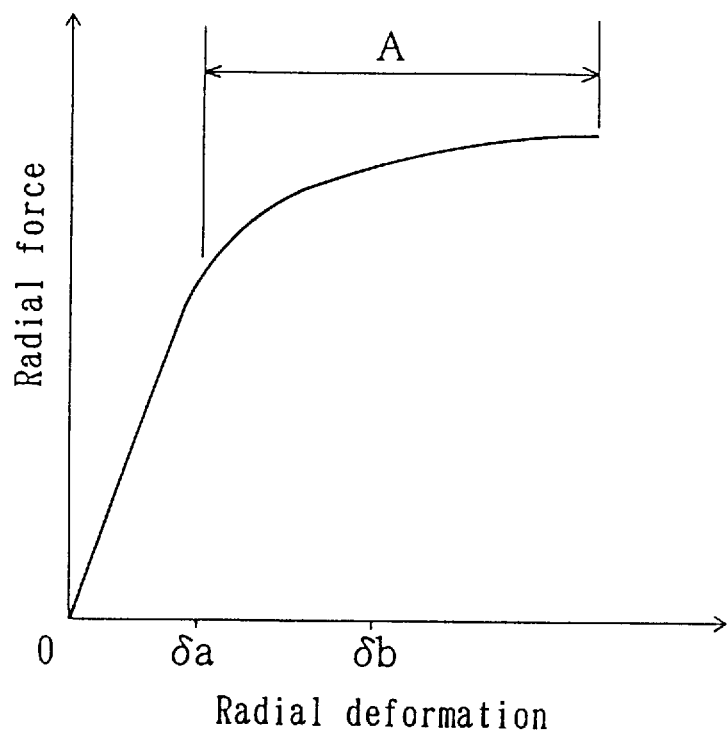
FIG. 7 is a diagram showing the relationship between the radial deformation and the radial force in the first rotation restraining element in the embodiment of the present invention.

As the first rotation restraining element 51, a tolerance ring (made by the Rencol Tolerance Rings Company, SV type), for example, can be used. FIG. 7 shows the relationship between the radial deformation and the radial force in the first rotation restraining element 51. When the radial deformation is less than a specific value δa, the radial force increases in proportion to the radial deformation. When the radial deformation exceeds the specific value δa, that is, in a range A in the figure, the ratio of increase in the radial force relative to the radial deformation is smaller than that when the radial deformation is less than the specific value δa. The radial deformation of the first rotation restraining element 51 is set to a value δb in the range A in which the radial deformation exceeds the specific value δa.

By exerting a radial force corresponding to the radial deformation of the first rotation restraining element 51 on the steering shaft 3 and the driven bevel gear 10, frictional resistances can be generated at between the first rotation restraining element 51 and the steering shaft 3 and between the first rotation restraining element 51 and the driven bevel gear 10. Based on the frictional resistances, a torque for restraining the relative rotation between the steering shaft 3 and the driven bevel gear 10 can be generated. The restraining torque is set to a value greater than the steering assistance torque generated by the above-described motor 8. By this constitution, the relative rotation between the driven bevel gear 10 and the steering shaft 3 can be restrained when the steering assistance torque is transmitted from the driving bevel gear 9 to the steering shaft 3 via the driven bevel gear 10, whereby steering feeling reduction can be prevented.

In this embodiment, a woodruff key is used as the second rotation restraining element 61, which is fitted to the steering shaft 3 and the driven bevel gear 10 via clearances so as to restrain the relative rotation between the steering shaft 3 and the gear 10, as illustrated in FIGS. 4 and 5. More specifically, the second rotation restraining element 61 is fitted into key. grooves 3s and 10s formed on the steering shaft 3 and the driven bevel gear 10 in the split 51a of the above-described first rotation restraining element 51.

The strength of the second rotation restraining element 61 is set so that it is broken when a preset breaking torque is exerted on the steering shaft 3. The breaking torque is in excess of the torque for restraining the relative rotation of the steering shaft 3 and the driven bevel gear 10 generated based on the deformation of the above-described first rotation restraining element 51. The breakage of the second rotation restraining element 61 allows the relative rotation between the steering shaft 3 and the driven bevel gear 10, whereby manual steering operation for fail-safe driving in the case of motor locking is enabled, and whereby the driven bevel gear 10 is prevented from breakage due to motor inertia which is exerted when steering angle reaches its limit. In short, the second rotation restraining element 61 serves as a safety as if a mechanical fuse.

Also, since the restraining torque generated based on the deformation of the first rotation restraining element 51 is set to a value lower than the breaking torque of the second rotation restraining element 61, the first rotation restraining element 51 can be made compact, whereby the necessity of enlargement of the electric power steering device 1 is obviated.

The gear type of each of the driving bevel gear 9 and the driven bevel gear 10 can be straight or spiral gear. In the case of spiral gear, the driven bevel gear 10 receives an axial force when the rotation of the driving bevel gear 9 is transmitted to the steering shaft 3. The axial movement of the driven bevel gear 10 along the steering shaft 3 by the axial force is restrained by restraining portions. As the restraining portions, the bearing 26 for supporting the second shaft 3b by the housing 21 of the torque sensor 7, and a nut 52 screwed to a male screw portion 3b' on the outer circumference of the second shaft 3b via a female screw portion 52' are provided at a interval along the axial direction, as illustrated in FIG. 4. The driven bevel gear 10 is arranged between the bearing 26 and the nut 52. The axial length L1 of the driven bevel gear 10 is set slightly smaller than the axial length L2 between the bearing 26 and the nut 52. The nut 52 is fixed to the steering shaft 3 by being caulked after assembling.

The first rotation restraining element 51 is arranged in a circumferential groove 3e formed on the outer circumference of the second shaft 3b. The axial length L3 of the circumferential groove 3e is set smaller than the axial length L1 of the driven bevel gear 10, and the circumferential groove 3e is arranged between both axial ends of the driven bevel gear 10. Thereby, the outer circumference of the second shaft 3b, which faces the inner circumference of the driven bevel gear 10 between both the axial ends, constitutes a restraining portion 3b" for restraining the radial movement of the driven bevel gear 10. The outer diameter D1 of the restraining portion 3b" is set slightly smaller than the inner diameter D2 of the driven bevel gear 10.

By this constitution the axial and radial movements of the driven bevel gear 10 relative to the steering shaft 3 are restrained. The change of the contact rate between the driven bevel gear 10 and the driving bevel gear 9 and the change of the backlash of the gears 9, 10 can therefore be prevented, whereby the change of steering feeling can be prevented.

The present invention is not limited to the above-described embodiment. For example, although the present invention is applied to an electric power steering device of the rack and pinion type in the above-described embodiment, the type of electric power steering device is not limited, and the present invention is applicable to the ball screw type. Also, the gear fitted on the steering shaft is not limited to the bevel gear, for example, a worm wheel can be fitted on the steering shaft, in this case the worm is attached to the motor's output shaft. Also, the first rotation restraining element is not limited to the tolerance ring, as long as it is capable of exerting a radial force corresponding to its radial deformation on the steering shaft and the gear. Also, the second rotation restraining element is not limited to the woodruff key, as long as it can be fitted to the steering shaft and the gear via clearances so as to restrain the relative rotation between the shaft and the gear, for example, it can be a pin.

What is claimed is:

1. An electric power steering device, comprising:

a steering shaft;

a gear fitted on an outer circumference of the steering shaft;

a steering assistance motor generating a torque to be transmitted to the steering shaft via the gear;

a first rotation restraining element, sandwiched between and always contacting both the outer circumference of the steering shaft and an inner circumference of the gear, so as to be radially deformed;

a second rotation restraining element fitted to the steering shaft and the gear via clearances so as to restrain relative rotation between the steering shaft and the gear;

wherein;

a frictional restraining torque for restraining the relative rotation between the steering shaft and the gear is generated by exerting a radial force corresponding to the radial deformation of the first rotation restraining element on the steering shaft and the gear;

the restraining torque is less than a breaking torque of the second rotation restraining element; and when the second rotation restraining element is broken, the relative rotation between the steering shaft and the gear is allowed so as to enable manual steering operation for fail-safe driving.

2. The electric power steering device according to claim 1, wherein:

the first rotation restraining element has a characteristic, in that the radial force increases in proportion to the radial deformation when its radial deformation is less than a specific value, and the ratio of increase in the radial force to the radial deformation when the radial deformation exceeds the specific value is smaller than that when the radial deformation is less than the specific value; and wherein the radial deformation is set to a value in a range in which the radial deformation exceeds the specific value.

3. The electric power steering device according to claim 1, further comprising:

means for restraining the axial and radial movements of the gear relative to the steering shaft.

4. The electric power steering device according to claim 2, further comprising:

means for restraining the axial and radial movements of the gear relative to the steering shaft.

* * * * *